(12) United States Patent
Sheng et al.

(10) Patent No.: US 12,108,283 B2
(45) Date of Patent: Oct. 1, 2024

(54) HIERARCHICAL NETWORK OPERATION AND RESOURCE CONTROL SYSTEM AND METHOD FOR MEGA SATELLITE CONSTELLATIONS

(71) Applicant: Xidian University, Xi'an (CN)

(72) Inventors: Min Sheng, Xi'an (CN); Di Zhou, Xi'an (CN); Sijing Ji, Xi'an (CN); Weigang Bai, Xi'an (CN); Jiandong Li, Xi'an (CN); Yan Shi, Xi'an (CN); Haoran Li, Xi'an (CN)

(73) Assignee: Xidian University, Xi'an (CN)

( * ) Notice: Subject to any disclaimer, the term of this patent is extended or adjusted under 35 U.S.C. 154(b) by 410 days.

(21) Appl. No.: 17/724,454

(22) Filed: Apr. 19, 2022

(65) Prior Publication Data
US 2022/0353742 A1    Nov. 3, 2022

(30) Foreign Application Priority Data
Apr. 25, 2021    (CN) .......................... 202110449142.6

(51) Int. Cl.
*H04B 7/00*    (2006.01)
*H04B 7/08*    (2006.01)
(Continued)

(52) U.S. Cl.
CPC ........ *H04W 28/0864* (2023.05); *H04B 7/088* (2013.01); *H04B 7/18547* (2013.01)

(58) Field of Classification Search
CPC ............................................... H04W 28/0864
See application file for complete search history.

(56) References Cited

U.S. PATENT DOCUMENTS

| 2022/0394488 A1* | 12/2022 | Navarro | ............... H04L 27/0006 |
| 2023/0155670 A1* | 5/2023 | Song | ................... H04B 7/18519 |
| | | | 455/12.1 |

OTHER PUBLICATIONS

L. Wang, C. Jiang, L. Kuang, S. Wu, H. Huang and Y. Qian, "High-Efficient Resource Allocation in Data Relay Satellite Systems With Users Behavior Coordination," in IEEE Transactions on Vehicular Technology, vol. 67, No. 12, pp. 12072-12085, Dec. 2018, doi: 10.1109/TVT.2018.2872085. (Year: 2018).*
(Continued)

*Primary Examiner* — Gary Mui
(74) *Attorney, Agent, or Firm* — Hemisphere Law, PLLC; Zhigang Ma (57) ABSTRACT

Hierarchical network operation and resource control system and method for a mega satellite constellation, belonging to the field of spatial information technology, are provided. The hierarchical network operation and resource control system includes a service layer, a global organization layer, a local coordination layer and a resource layer. The service layer is used as an input to drive operation of whole system. The global organization layer is to realize "operation, measurement and control" integrated control and decision of whole network. The local coordination layer is to realize local management decision and management slice generation. The resource layer is to provide physical resource and physical device and realize resource virtualization. By deploying local coordination layer controllers on GSO or MEO satellites, the deployment of local coordination layer controllers is not limited by inability of deploying ground stations globally and therefore the control of large-scale LEO satellite constellation can be achieved.

8 Claims, 7 Drawing Sheets

(51) Int. Cl.
H04B 7/185 (2006.01)
H04W 28/086 (2023.01)

(56) References Cited

OTHER PUBLICATIONS

J. Du, C. Jiang, J. Wang, Y. Ren, S. Yu and Z. Han, "Resource Allocation in Space Multiaccess Systems," in IEEE Transactions on Aerospace and Electronic Systems, vol. 53, No. 2, pp. 598-618, Apr. 2017, doi: 10.1109/TAES.2017.2651598. (Year: 2017).*

M. Sheng, D. Zhou, R. Liu, Y. Wang and J. Li, "Resource Mobility in Space Information Networks: Opportunities, Challenges, and Approaches, " in IEEE Network, vol. 33, No. 1, pp. 128-135, Jan./Feb. 2019, doi: 10.1109/MNET.2018.1700244. (Year: 2019).*

YuanZhi He, YiZhen Jia, XuDong Zhong, "A traffic-awareness dynamic resource allocation scheme based on multi-objective optimization in multi-beam mobile satellite communication systems", International Journal of Distributed Sensor Networks, vol. 13, No. 8, pp. 155014771772355, 2017. (Year: 2017).*

Zhou Di et al, "Network Operation, Maintenance and Resource Management in Mega Constellation System", Space-Integrated-Ground information Networks, Sep. 2020, pp. 26-35, vol. 1, No. 1.

* cited by examiner

HIERARCHICAL NETWORK OPERATION AND RESOURCE CONTROL SYSTEM AND METHOD FOR MEGA SATELLITE CONSTELLATIONS

FIELD OF DISCLOSURE

The present disclosure relates to the field of spatial information technologies, and more particularly to hierarchical network operation and resource control system and method for a mega satellite constellation.

BACKGROUND OF DISCLOSURE

At present, a mega satellite constellation is a network system using more than 10,000 space platforms (geosynchronous, medium and low earth-orbit satellites) as carriers to transmit and process service data of various user nodes (handheld terminals, IoT nodes, vehicle nodes, aircraft nodes, etc.) in real time, and therefore can meet major application needs of Internet connection, data acquisition, voice communication, navigation and positioning in areas without ground cellular network coverage, and ensure service effectiveness and reliability in areas with low service performance of ground cellular network, thereby expanding Internet and communication services to the whole world, space and even deep space. With the development of satellite and communication technologies, the satellite constellation has developed from an early architecture with single orbit and a few to dozens of satellites to a mega constellation with multiple layers and thousands of satellites, and the scale of the constellation has a trend of further expansion, a future mega satellite constellation will contain at least ten thousands of satellites, and a vertical dimension of the constellation will involve three orbital types of low, medium and geosynchronous.

In an existing satellite network operation and resource control architecture, measurement, operation and control for the satellite network are separated from each other. These functional modules are distributed in different types of ground nodes, such as a ground operation center, a ground measurement center and a ground network control center, etc., which not only increases the measurement, operation and control costs, but also reduces reference dimensions of management decision. Therefore, it is an inevitable trend for future satellite networks to jointly arrange the measurement, operation and control functions on a same type of ground node and thereby realize the integration of measurement, operation and control.

However, a centralized management and control has a relatively large management and control delay, and a management and control center has relatively heavy burden. Because the satellite communication system designed and implemented in China usually cannot deploy ground gateway stations around the whole world, control signaling are needed to be sent back to nearby ground gateway stations through inter-satellite links for processing, which would result in jams of the ground gateway stations and local satellite networks, and a large amount of signaling returns would increase the network load and the cost of control. With the enhancement of satellite load capacity, satellite nodes can carry controllers with measurement, operation and control functions in a distributed manner to realize, for users and services under their coverages, wireless resource management such as wireless resource scheduling and allocation, and mobility management such as location management and handover management. Distributed controller deployment refers to the deployment of controllers on some of network nodes, and at present there are two leading architectures. A first architecture is to deploy a same level of distributed controllers in a system, the same level of distributed controllers are usually deployed on ground gateway stations or low earth-orbit (LEO) satellites, and these controllers need to constantly interact with each other to obtain information of the whole network, so that the first architecture would increase the cost of network control and the network load, and the number of the controllers is proportional to the scale of network, and therefore it is not suitable for a mega satellite network. A second architecture a multi-level hierarchical controller deployment architecture, in which a high-level controller can connect and control multiple low-level controllers and distribute information to the low-level controllers, and each low-level controller is responsible for managing and controlling all network nodes in its control domain. The high-level controller is usually deployed in a ground gateway station, while each low-level controller is deployed on a LEO satellite, a medium earth-orbit (MEO) satellite or a geosynchronous orbit (GSO) satellite, but the deployment of controllers on a large amount of satellite nodes would undoubtedly increase manufacture and operation costs of satellite.

However, the above distributed controller deployment architectures neither give specific system function module design and control method inside the controllers, nor do they consider application scenarios of a future mega satellite network, the deployment cost of controllers and the restricted global deployment of ground stations, etc., and therefore they cannot meet the urgent demand for the integration of "measurement, operation and control" of a future satellite network. Therefore, it is urgent to propose hierarchical network operation and resource control system and method for a mega satellite constellation, while taking into consideration network operation and control and system costs.

Based on the above analysis, problems and defects in the related art are as follows:

(1) the centralized control has relatively large control latency, and the control center has relatively heavy burden. Moreover, control signaling are needed to be sent back to nearby ground gateway stations through inter-satellite links for processing, which would result in congestions of ground gateway stations and local satellite networks, and the large amount of signaling returns would increase the network load and the cost of control.

(2) the same level of distributed controllers are usually deployed on ground gateway stations or LEO satellites, and these controllers need to constantly interact with each other to obtain information of whole network, so that the architecture would increase the cost of network control and the network load, and the number of the controllers is proportional to the scale of network, and therefore it is not suitable for the mega satellite network.

(3) in the multi-level hierarchical controller deployment architecture, the high-level controller can connect and control multiple low-level controllers and distribute information to the low-level controllers, and each the low-level controller is responsible for managing and controlling all network nodes in its control domain. The high-level controller is usually deployed in the ground gateway station, while each the low-level controller is deployed on the LEO satellite, the MEO satellite or the GSO satellite, but the deployment of controllers on a large amount of satellite nodes would undoubtedly increase manufacture and operation costs of satellite.

(4) the distributed controller deployment architectures neither give specific system function module design and control method inside the controllers, nor do they consider application scenarios of future mega satellite networks, the deployment cost of controllers and the restricted global deployment of ground stations, etc., and therefore they cannot meet the urgent demand for the integration of "measurement, operation and control" of the future satellite network.

Difficulties in solving the above problems and defects are that: (1) it is difficult for an integrated design of network measurement, operation and control function modules, clarifying mutual collaboration relationships between the modules, and establishing a complete network operation and resource control method; (2) in the multi-level hierarchical controller deployment architecture, it is difficult to reasonably divide specific functions of different levels of controllers; (3) the problem of poor temporal-effectiveness of network control caused by the satellite system unable to deploy ground stations globally is difficult to be solved.

Significances of solving the above problems and defects are that: (1) realizing system functional modules and method designs of a hierarchical network operation and resource control of a satellite network integrated with measurement, operation and control; (2) effectively solving the problem of poor temporal-effectiveness of network control caused by the satellite system unable to deploy ground stations globally, and avoiding the problem of high network construction cost caused by a large amount of LEO satellite nodes carrying controllers; (3) providing an effective reference for the design of network operation and resource control system for a future mega satellite network.

SUMMARY OF THE DISCLOSURE

In view of the problems and defects in the related art, the present disclosure provides hierarchical network operation and resource control system and method adapted for a mega satellite constellation.

Specifically, in the present disclosure, a hierarchical network operation and resource control system adapted for a mega satellite constellation is provided. The hierarchical network operation and resource control system may include:

a service layer, including K number of services to be controlled, the K services to be controlled being used as inputs of the hierarchical network operation and resource control system to drive operation of whole system, K being a positive integer;

a global organization layer, including one global organization layer controller, the global organization layer being deployed at a ground gateway station and configured (i.e., structured and arranged) to realize "operation, measurement and control" integrated control of whole network and global resource management decisions;

a local coordination layer, including Q number of local coordination layer controllers, the Q number of local coordination layer controllers all being deployed at GSO or MEO satellites and configured to realize local resource management decision and control slice generation, Q being a positive integer; and a resource layer, including a physical resource domain and a virtual resource domain, the physical resource domain containing satellites on different orbits and ground gateway stations and being configured to supply physical resource entities, wireless resource and transmission channels; and the virtual resource domain being configured to realize virtualization of physical resource, build a virtual resource pool and a virtual resource space, and perform hierarchical characterization for virtual resources.

In an embodiment, the global organization layer controller may include:

a service reshaping module with an element extraction function and a service reshaping function, the element extraction function being configured to analyze service attributes and features and realize extraction of service key elements, the service reshaping function being configured to perform unified characterization on the services to be controlled according to extracted service element information, and the service attributes and features including service types, service statistical features, and the requirement of quality of service;

a resource reshaping module with an attribute extraction function and a resource reshaping function, the attribute extraction function being configured to acquire and analyze resource attributes of whole network, the resource reshaping function being configured to realize unified characterization on the resource attributes of whole network, and the resource attributes of whole network including resource types and resource distribution.

an operation and measurement control module, configured to measurement and operation control of whole network to ensure effectiveness and reliability of satellite network;

a state reshaping module, configured to realize unified characterization on network states of whole network to provide diversified decision dimensions for resource management decision;

an intelligent resource management module, configured to realize global resource management decision of network including wireless resource management decision and mobility management decision; and a decision matching module, configured as an interface between the global organization layer controller and the local coordination layer controllers, and configured to realize matching of the global resource management decision with the local coordination layer controllers and map the global resource management decision to matched local coordination layer controllers.

In an embodiment, the service reshaping module, the resource reshaping module, the operation and measurement control module, the state reshaping module, the intelligent resource management module, and the decision matching module are software modules stored in one or more memories in the global organization layer controller and executable by one or more processors in the global organization layer controller coupled to the one or more memories.

In an embodiment, each of the local coordination layer controllers may include:

a match mapping module, configured to store the global resource management decision mapped from the global organization layer controller to current the local coordination layer controller, realize classification and queueing as per decision priority on the stored global resource management decision, and send the global resource management decision sequentially to a resource slice operation module according to the decision priority;

a parameter migration module, configured to perform partial migration of decision knowledge and experience parameters of the global organization layer and thereby realize local decision of wireless resource management and mobility management; and the resource slice operation module, configured to realize resource slice computation and generation according to the local resource management decision.

In an embodiment, the match mapping module, the parameter migration module, and the resource slice operation module are software modules stored in one or more memories in the local coordination layer controller and executable by one or more processors in the local coordination layer controller coupled to the one or more memories.

In an embodiment, the operation and measurement control module may include:

a service management sub-module, configured to centralized management of services of whole network, the centralized management including service analysis, service statistics and service forecast;

a fault management sub-module, configured to realize real-time sensing, accurate diagnosis, rapid recovery, statistics and post-maintenance of faults of satellite, types of the faults including satellite network faults, satellite device faults and satellite operation faults; and a satellite management sub-module, configured to realize analysis and statistics of quantity and quality of resource of whole network, types of the resource including satellite computation resource, satellite storage resource, inter-satellite link resource, satellite-ground feed and service link resource, spectrum resource, and antenna resource.

In an embodiment, the state reshaping module may include: a service state sub-module, a satellite state sub-module and a resource state sub-module; the service state sub-module, the satellite state sub-module and the resource state sub-module are configured to extract service state data, satellite state data and resource state data respectively from the operation and measurement control module, and reshape the service state data, the satellite state data and the resource state data respectively to obtain reshaped data; and the reshaped data are used as decision indicators for the intelligent resource management module.

In an embodiment, the intelligent resource management module may include:

a wireless resource management sub-module, configured to realize global wireless resource management decision of services, the global wireless resource management decision including resource types required by services; and the resource types including spectrum, timeslot, power and antenna, and required resource quantities; and a mobility management sub-module, configured to perform location management of user nodes and handover management of services, the location management including location update of user nodes and location attachment point selection of user nodes, and the handover management including handover trigger decision of services and handover target selection of services.

In an embodiment, the resource slice operation module is configured to compute and generate service resource slices and handover management slices. The service resource slices contain spectrum resource, power resource, timeslot resource and antenna resource required by services; and the spectrum resource, the power resource, the timeslot resource and the antenna resource are capable of being mapped to specific physical devices and physical resource on the resource layer, to achieve allocation and scheduling of wireless resource. The handover management slices contain signaling carrying resource, beam resource and channel resource required for service handover; the signaling carrying resource, the beam resource and the channel resource are capable of being mapped to specific physical devices and physical resource, to achieve allocation and scheduling of wireless resource required for signaling interaction during a handover process and thereby ensure reliability of the handover process.

Another objective of the present disclosure is to provide a hierarchical network operation and resource control method for a mega satellite constellation, adapted for the hierarchical network operation and resource control system of any one of the above embodiments. The hierarchical network operation and resource control method may include following step 1 through step 6:

step 1, constantly acquiring attributes of resource of whole network and reshaping the resource, performing service element extraction and service reshaping on a service that requires wireless resource allocation, and sending the service and the attributes of resource after reshaping to an intelligent resource management module as management decision indicators, by a ground global organization layer controller; the step 1 drives the operation of whole system;

step 2, performing real-time monitoring and management on services, faults and satellites, and reshaping operation and measurement data into service states, satellite states and resource states required by wireless resource management decision, by an operation and measurement control module; the step 2 provides information support and decision basis for the system to make network operation and resource control decision;

step 3, making, by a wireless resource management sub-module of the intelligent resource management module, global wireless resource management decision based on decision indicators provided by a service reshaping module, a resource reshaping module and a state reshaping module and the service and the attributes of resource after reshaping, the global wireless resource management decision including types of allocated resource and required resource quantities of the allocated resource; the step 3 directly guides resource control decision of the local coordination layer controller;

step 4, mapping, by a decision matching module, the global wireless resource management decision made by the wireless resource management sub-module of the intelligent resource management module to a corresponding one of local coordination layer controllers; the step 4 provides an interface operation for collaboration between the global organization layer controller and the local coordination layer controller;

step 5, caching and sorting as per priority, by a match mapping module of the corresponding one of the local coordination layer controllers, a plurality of global resource management decision; and processing, by a resource slice operation module, the plurality of global resource management decision in order of the priority; for the global wireless resource management decision, the resource slice operation module obtaining wireless resource requirement for completing current the service according to information of the global wireless resource management decision, and allocating and generating specific resource slices for the service; the step 5 realizes virtual resource allocation;

step 6, mapping the service resource slices to specific physical devices and physical resource to support an entire process of service, wherein the resource slices are hierarchical characterization of virtual resource; the step 6 realizes the mapping from virtual resource to actual physical resource according to the resource management decision, and thereby completes the resource scheduling of satellite network.

In an embodiment, the intelligent resource management module including the wireless resource management submodule, the operation and measurement control module, the service reshaping module, the resource reshaping module, the state reshaping module, and the decision matching module are integrated into the global organization layer controller; and the match mapping module and the resource slice operation module are integrated into the corresponding local coordination layer controller.

In an embodiment, in step 5, a deployment method of the local coordination layer controllers may include:

(1) based on an orbital altitude difference κ between a geosynchronous orbit (GSO) or medium earth-orbit (MEO) satellite and a low earth-orbit (LEO) satellite, an orbital altitude $\kappa_{leo}$ of the LEO satellite, a beam coverage angle θ of the GSO or MEO satellite, and average latitude difference ΔLa and longitude difference ΔLo between LEO satellites, solving an equation as follows:

$$\tan\frac{\theta}{2} = \frac{(R+\kappa_{leo})\sin(\alpha(\theta, \kappa_{leo}, \kappa))}{(R+\kappa_{leo}+\kappa)-(R+\kappa_{leo})\cos(\alpha(\theta, \kappa_{leo}, \kappa))};$$

where, a sphere O is a sphere with the center of the Earth as its center and a distance R from any point in an orbital plane of the LEO satellite to the center of the Earth as its radius, $\alpha(\theta, \kappa_{leo}, \kappa)$ is a sphere center angle of the sphere O corresponding to a beam angle of the local coordination layer controller, and a value of $\alpha(\theta, \kappa_{leo}, \kappa)$ is obtained by solving the following equations:

$$\begin{cases} \alpha(\theta, \kappa_{leo}, \kappa) = \arccos\left[\frac{(R+\kappa+\kappa_{leo})^2 + (R+\kappa_{leo})^2 - x^2}{2(R+\kappa_{leo})(R+\kappa+\kappa_{leo})}\right] \\ \cos\frac{\theta}{2} = \frac{(R+\kappa+\kappa_{leo})^2 + x^2 - (R+\kappa_{leo})^2}{2x(R+\kappa+\kappa_{leo})} \end{cases};$$

where, x is a maximum linear distance between any one of the local coordination layer controllers and any one LEO satellite in a control domain of the local coordination layer controller;

(2) calculating a variable $V(\theta, \kappa_{leo}, \kappa)$ of LEO satellites covered by a rectangular or circular beam of the local coordination layer controller as follows:

$$V(\theta, \kappa_{leo}, \kappa) \approx \left\lceil\frac{\alpha(\theta, \kappa_{leo}, \kappa)}{\Delta La}\right\rceil \times \left\lceil\frac{\alpha(\theta, \kappa_{leo}, \kappa)}{\Delta Lo}\right\rceil,$$

where, ΔLa and ΔLo are the average latitude difference and longitude difference between LEO satellites near the equatorial plane, respectively;

(3) calculating a number N of LEO satellites controllable within H hops of single local coordination layer controller:

$$N = 2\cdot\left\{\frac{V(\theta, \kappa_{leo}, \kappa)}{2} + 2(H-1) + \sum_{j=1}^{H-1}\left(\frac{V(\theta, \kappa_{leo}, \kappa)}{2} + 2(H-1-j)\right)\right\};$$

where, is a counting factor, and H is a positive integer; and (4) based on a number $M_{leo}$ of satellites in a LEO satellite constellation and the number N of LEO satellites controllable within H hops of single local coordination layer controller, calculating a number Q of the local coordination layer controllers deployed on GSO or MEO satellites is $Q=M_{leo}/N$.

Still another objective of the present disclosure is to provide an information data processing terminal. The information data processing terminal is used to realize the hierarchical network operation and resource control system for a mega satellite constellation.

In combination with all the above technical solutions, advantages and positive effects of the present disclosure may be that: the hierarchical network operation and resource control system for a mega satellite constellation as provided by the present disclosure includes a service layer (user layer), a global organization layer, a local coordination layer and a resource layer; the global organization layer controller realizes integrated measurement, operation and control of network, and can apply reinforcement learning and deep learning methods to realize global decision for wireless resource management and mobility management of services; the local coordination layer controller migrates part of decision knowledge and experience to realize localized control of LEO satellite nodes and mobile services in its control domain, and is responsible for computing and generating resource management slices, thereby providing physical resource and physical device supports for the control process.

Aiming at control features and existing problems of the mega satellite constellation, the present disclosure deploys local coordination layer controllers at GSO or MEO satellites, so that the deployment of local coordination layer controllers will not be limited by the inability of deploying ground stations globally, thereby realizing management and control of a large-scale LEO satellite constellation by using fewer local coordination layer controllers. Moreover, an approximate calculation formula of the number of local coordination layer controllers required under a certain scale of LEO satellite constellation is given, which provides a theoretical basis for the system design of large-scale satellite constellation and the deployment of controllers.

The present disclosure provides a resource control method based on hierarchical network operation and resource control architecture, and gives an approximate calculation formula for the number of local coordination layer controllers required under a certain scale of LEO satellite constellation, which defines module and function designs within the architecture, can realize the integration of measurement, operation and control of satellite network, can eliminate the impact of global ground station deployment restriction on satellite network operation and control, and can reduce the control latency, and therefore can be used for architecture and method design of large-scale satellite constellation network operation and resource control.

The hierarchical network operation and resource control architecture for a mega satellite constellation proposed by the present disclosure may have the following important experimental conclusions: first, with the increase of the scale of satellite constellation, the latency of single-time interaction between the local coordination layer controller and the LEO satellite gradually decreases, and the number of required local coordination layer controllers decreases; second, with the increase of the number of controllable hops of the local coordination layer controller, the latency of single-time interaction between the local coordination layer controller and the LEO satellite gradually increases, while the number of required local coordination layer controllers first decreases rapidly and then decreases slowly, that is, the positive benefit brought by the number of controllable hops gradually decreases; third, there is a trade-off between the number of local coordination layer controllers and the average latency of single-time interaction, increase of the number of controllable hops of the local coordination layer controller cannot continuously bring about a large positive effect in the number of local coordination layer controllers; and fourth, under the condition of meeting the requirement of latency control, the deployment of a small number of local coordination layer controllers can realize the control of a large-scale satellite constellation.

BRIEF DESCRIPTION OF THE DRAWINGS

In order to describe technical solutions of embodiments of the present disclosure more clearly, drawings used in the embodiments of the present disclosure will be briefly introduced below. Apparently, the drawings described below are only some of embodiments of the present disclosure, and thus for those skilled in the art, other drawings can be obtained according to these drawings without any creative effort.

DETAILED DESCRIPTION OF EMBODIMENTS

In order to make objectives, technical solutions and advantages of the present disclosure be clearer, the present disclosure will be further described in detail in combination with embodiments. It should be understood specific embodiments described herein are used merely to explain the present disclosure and are not intended to limit the present disclosure.

Aiming at the problems in the related art, the present disclosure provides hierarchical network operation and resource control system and method for a large-scale or mega satellite constellation. The present disclosure will be described in detail below with reference to the accompanying drawings.

Figure 4:
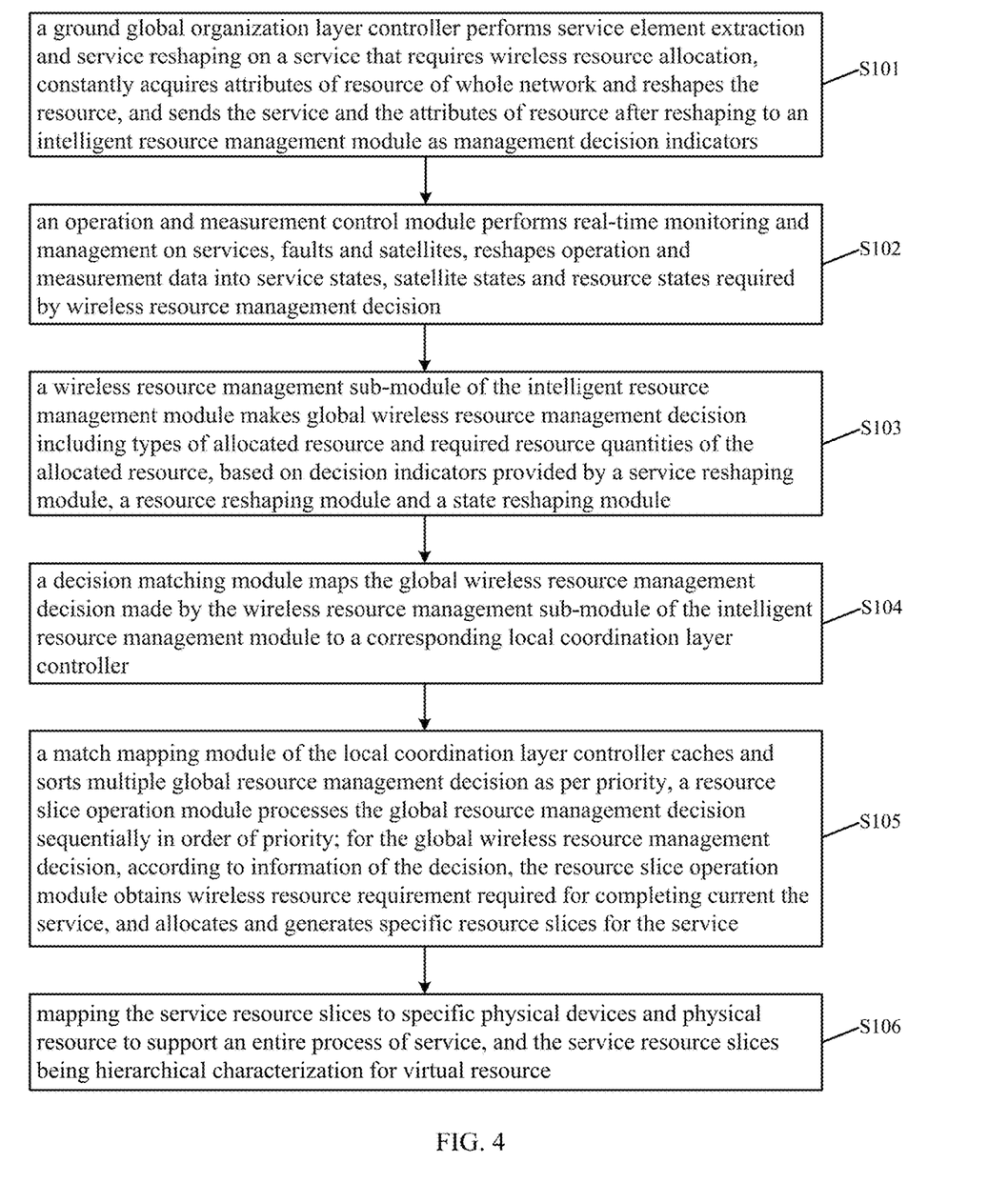
FIG. 4 illustrates a schematic flowchart of a hierarchical network operation and resource control method for a large-scale satellite constellation according to an embodiment of the present disclosure.

Referring to FIG. 4, a hierarchical network operation and resource control method for a large-scale or mega satellite constellation may include the following steps S101~S106.

In the step S101, a ground global organization layer controller performs service element extraction and service reshaping on a service that requires wireless resource allocation, constantly acquires attributes of resource of whole network and reshapes the resource, and sends the service and the attributes of resource after reshaping to an intelligent resource management module as management decision indicators.

In the step S102, an operation and measurement control module performs real-time monitoring and management on services, faults and satellites, reshapes operation and measurement data into service states, satellite states and resource states required by wireless resource management decision.

In the step S103, a wireless resource management sub-module of the intelligent resource management module makes global wireless resource management decision including types of allocated resource and required resource quantities of the allocated resource, based on decision indicators provided by a service reshaping module, a resource reshaping module and a state reshaping module.

In the step S104, a decision matching module maps the global wireless resource management decision made by the wireless resource management sub-module of the intelligent resource management module to a corresponding local coordination layer controller.

In the step S105, a match mapping module of the local coordination layer controller caches and sorts multiple global resource management decision as per priority, a resource slice operation module processes the multiple global resource management decision sequentially in order of priority; for the global wireless resource management decision, according to information of the decision, the resource slice operation nodule obtains wireless resource requirement required for completing current service, and allocates and generates specific resource slices for the service.

In the step S106, the resource slices are hierarchical characterization of virtual resource, which are capable of being mapped to specific physical devices and physical resource, to support an entire service process.

The technical solutions of the present disclosure will be further described below in combination with embodiments.

Figure 1:
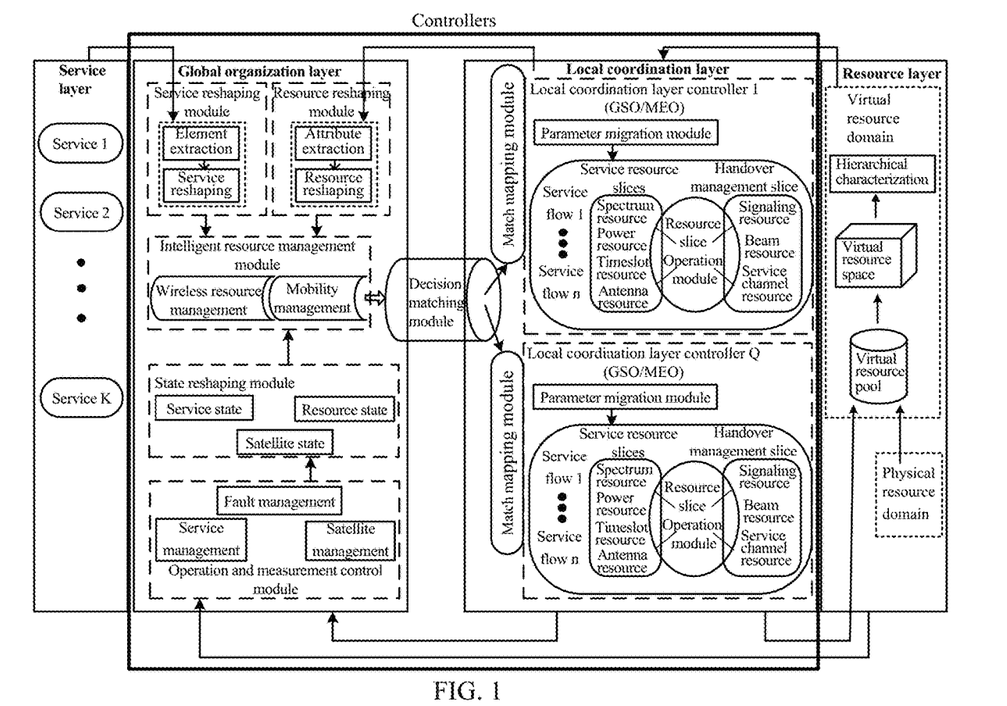
FIG. 1 illustrates a schematic diagram of a hierarchical network operation and resource control system for a large-scale satellite constellation according to an embodiment of the present disclosure.

Referring to FIG. 1, the present disclosure provides a hierarchical network operation and resource control architecture and method for a large-scale or mega satellite constellation. The architecture may include a service layer, a global organization layer, a local coordination layer and a resource layer.

Specifically, the service layer may contain multiple (i.e., more than one) services to be controlled. These services to be controlled are used as inputs of the hierarchical network operation and resource control architecture to drive the operation of the whole system.

The global organization layer may contain one global organization layer controller. The global organization layer controller is deployed at a ground gateway station to realize control and decision of integrated "measurement, operation and control" of the whole network. The global organization layer controller may include six parts: a service reshaping module, a resource reshaping module, an operation and measurement control module, a state reshaping module, an intelligent resource management module, and a decision matching module. In an illustrated embodiment, the six parts may be software modules stored in one or more memories and executable by one or more processors coupled to the one or more memories.

In particular, the service reshaping module in the global organization layer controller may include an element extraction function and a service reshaping function. The element extraction function is configured to analyze service attributes and features, such as service types, service statistical features, and service quality requirement, and to realize extraction of service key elements. The service reshaping function is configured to perform unified characterization on the services to be controlled for reshaping according to the extracted service element information, and send the reshaped services to the intelligent resource management module to implement a control decision-making process.

The resource reshaping module in the global organization layer controller may include an attribute extraction function and a resource reshaping module. The attribute extraction function is configured to acquire and analyze resource attributes of whole network, such as resource types and resource distribution. The resource reshaping function is configured to perform unified characterization on the resource attributes of whole network.

The operation and measurement control module in the global organization layer controller is configured to perform measurement and operation controls of whole network and thereby guarantee effectiveness and reliability of the satellite network. The operation and measurement control module may include three functions: a service management function, a fault management function, and a satellite management function. The service management function is configured to perform centralized management of services of whole network, including service analysis, service statistics and service forecast. The fault management function is configured to perform real-time sensing, accurate diagnosis, rapid recovery, statistics, and post-maintenance of satellite faults. Types of the satellite faults include satellite network faults, satellite device faults, satellite operation faults, etc. The satellite management function is configured to perform collection and control of quantity and quality of resource of whole network, such as satellite computation resource, satellite storage resource, inter-satellite link resource, satellite-to-ground feed and service link resource, spectrum resource, and antenna resource.

The state reshaping module in the global organization layer controller is configured to perform unified characterization on network states of whole network and thereby to provide diversified decision dimensions for management decision. The state reshaping module may include three functions: a service state function, a satellite state function, and a resource state function. The service state function is configured to realize centralized management of service states of whole network, including acquisition of service type, service quality requirement, service accessed satellite, service duration, service user information, service control log, etc. The satellite state function is configured to realize real-time monitoring and rapid diagnosis and statistics of satellite faults, such as satellite network faults, satellite device faults, and satellite operation faults. The resource state function is configured to realize collection and control of quantity and quality of resource of whole network, such as satellite computation resource, satellite storage resource, inter-satellite link resource, satellite-ground feed and service link resource, spectrum resource, and antenna resource.

The intelligent resource management module in the global organization layer controller is configured to realize global resource management decision of network and may include a wireless resource management sub-module and a mobility management sub-module. The wireless resource management sub-module is configured to realize wireless resource management decision of services, and the wireless resource management decision include resource types required by service, such as spectrum, timeslot, power and antenna, and resource quantities required of respective resource. The mobility management sub-module is configured to realize location management of user nodes including location update of user nodes and location attachment point selection of user nodes, and to realize handover management of service including switching trigger decision of service and switching target satellite selection of service.

The decision matching module in the global organization layer controller is an interface between the global organization layer and the local coordination layer and configured to realize accurate matching of global resource management decision with local coordination layer controllers, and map the global resource management decision to matched local coordination layer controllers.

The local coordination layer may include multiple local coordination layer controllers. Each of the local coordination layer controllers is deployed at a GSO satellite or a MEO satellite and configured to realize generation of local resource management decision and management slices. Each of the local coordination layer controllers may include three parts: a match mapping module, a parameter migration module, and a resource slice operation module. In an illustrated embodiment, the match mapping module, the parameter migration module, and the resource slice operation module are software modules stored in one or more memories and executable by one or more processors coupled to the one or more memories.

Specifically, the match mapping module in the local coordination layer controller is configured to cache global resource management decision mapped from the global organization layer to the local coordination layer controller, to realize classification and queueing as per priority to the global resource management decision, so that the global resource management decision will be sent to the resource slice operation module sequentially in order of priority of decision.

The parameter migration module in the local coordination layer controller is configured to realize partial migration of decision knowledge and empirical parameters of the global organization layer, thereby realizing localized decision-making for wireless resource management and mobility management.

The resource slice operation module in the local coordination layer controller is configured to realize computation and generation of resource slice based on global and/or local management decision information. There are two types of slices as generated: service resource slice and handover management slice. The service resource slice includes spectrum resource, power resource, timeslot resource, antenna resource, etc. required for service; and these resources can be mapped to specific resource layer physical facilities and physical resource, to achieve wireless resource allocation and scheduling for service. The switching management slice may include signaling-carrying resource, beans resource, service channel resource, etc. required for service switching; these resources can be mapped to specific physical facilities and physical resource, to achieve allocation and scheduling of wireless resource required for signaling interaction in a service switching process, ensuring the reliability of the switching process.

The resource layer may include a physical resource domain and a virtual resource domain. The physical resource domain includes satellites on different Earth-orbits and ground gateway stations, etc., and is configured: to provide physical resource entities such as switches, routers, various satellites, etc., to provide wireless resource such as spectrum, power, timeslot, antenna and beam of network node, and to provide transmission channels such as service channel and signaling control channel. The virtual resource domain is configured to realize virtualization of physical resource, construct a virtual resource pool and a virtual resource space, and perform hierarchical characterization on virtual resource.

Referring to FIG. 1, taking wireless resource management as an example, a network operation and resource control implementation process of the architecture is as follows:

1) a ground global organization layer controller performs service element (service type, service statistical feature, etc.) extraction and service reshaping for a service requiring wireless resource allocation, and meanwhile constantly acquires attributes (resource type, resource distribution, etc.) of resource of whole network and reshapes the resource. The service and the attributes of resource after reshaping are sent into the intelligent resource management module as management decision indicators.)

2) the operation and measurement control module performs real-time monitoring and management of services, faults and satellites, and reshapes operation and measurement data into service states, satellite states and resource states required for wireless resource management decision.

3) the wireless resource management sub-module of the intelligent resource management module makes global wireless resource management decision based on decision indicators provided by the service reshaping module, the resource reshaping module and the states reshaping module. The global wireless resource management decision includes types of allocated resource (spectrum, timeslot, power, antennas, etc.), and required resource quantities of the resource.

4) the decision matching module maps the global wireless resource management decision made by the wireless resource management sub-module of the intelligent resource management module to a corresponding local coordination layer controller.

5) the match mapping module of the corresponding local coordination layer controller caches global resource management decision and sorts all cached global resource management decision as per priority; the resource slice operation module processes the global resource control decision sequentially in order of priority of decision. For the global wireless resource management decision, according to information of the decision, the resource slice operation module obtains wireless resource requirement such as spectrum, power, timeslot and antenna required for completing the current service, and allocates and generates specific resource slices for the current service.

6) the resource slices of the service are hierarchical characterization of virtual resource and are capable of being mapped to specific physical devices and physical resource to support an entire service process.

Figure 2:
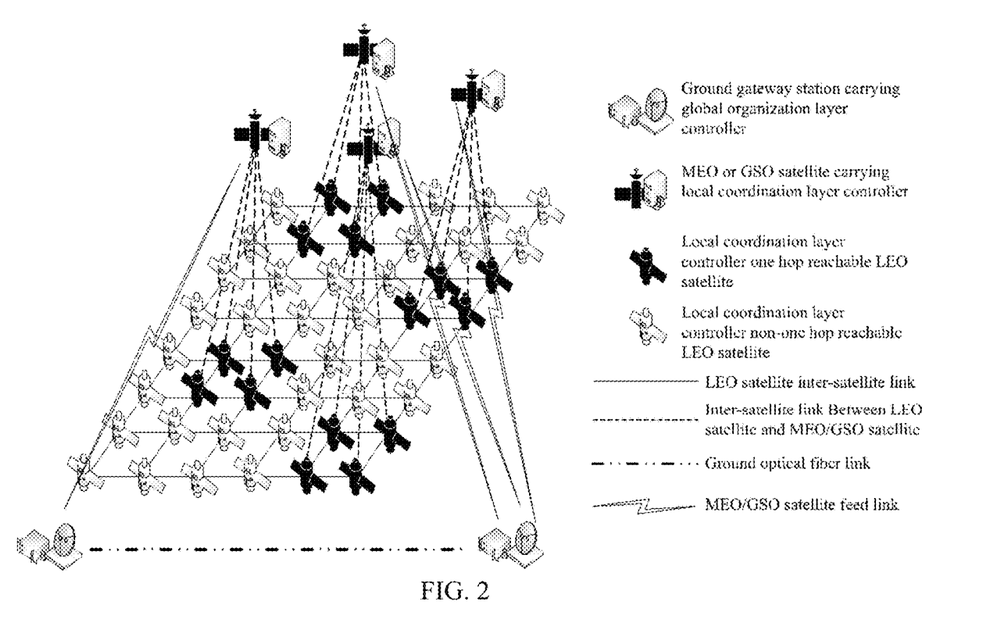
FIG. 2 illustrates a schematic diagram of a local coordination layer controller deployment architecture for a large-scale satellite constellation according to an embodiment of the present disclosure.

Referring to FIG. 2, the present disclosure, aiming at the deployment of local coordination layer controllers, provides a schematic diagram of a deployment architecture of local coordination layer controllers. The architecture may include three types of network nodes: global organization layer controller nodes, local coordination layer controller nodes, and other network nodes.

Specifically, the global organization layer controllers are deployed at ground gateway stations respectively. The ground gateway stations are connected to each other by a ground optical fiber link. Since deployment of the ground gateway stations is influenced by various factors such as geography, politics and population, the present disclosure does not involve a specific method for the deployment of ground gateway stations.

The local coordination layer controllers are deployed at MEO or GSO satellites, and specific deployment steps may be as follows:

(1) based on an orbital altitude difference $\kappa$ between the GSO or MEO satellite and a LEO satellite, an orbital altitude $\kappa_{leo}$ of the LEO satellite, a beam coverage angle $\theta$ of the GSO or MEO satellite, average latitude difference $\Delta La$ and longitude difference $\Delta Lo$ between LEO satellites, solving an equation as follows:

$$\tan\frac{\theta}{2} = \frac{(R + \kappa_{leo})\sin(\alpha(\theta, \kappa_{leo}, \kappa))}{(R + \kappa_{leo} + \kappa) - (R + \kappa_{leo})\cos(\alpha(\theta, \kappa_{leo}, \kappa))};$$

where, a sphere O is the center of the Earth and a distance R from any point in the orbit of the LEO satellite to the center of the Earth as its radius, $\alpha(\theta, \kappa_{leo}, \kappa)$ is sphere center angle of the sphere O corresponding to a beam angle of the local coordination layer controller, and a value of $\alpha(\theta, \kappa_{leo}, \kappa)$ can be obtained by solving the following equations:

$$\begin{cases} \alpha(\theta, \kappa_{leo}, \kappa) = \arccos\left[\frac{(R + \kappa + \kappa_{leo})^2 + (R + \kappa_{leo})^2 - x^2}{2(R + \kappa_{leo})(R + \kappa + \kappa_{leo})}\right] \\ \cos\frac{\theta}{2} = \frac{(R + \kappa + \kappa_{leo})^2 + x^2 - (R + \kappa_{leo})^2}{2x(R + \kappa + \kappa_{leo})} \end{cases};$$

where, x is a maximum linear distance between any one local coordination layer controller and any one LEO satellite in a control domain of the local coordination layer controller.

(2) calculating the number $V(\theta, \kappa_{leo}, \kappa)$ of LEO satellites that can be covered by a rectangular or circular beam of the local coordination layer controller as follows:

$$V(\theta, \kappa_{leo}, \kappa) \approx \left\lceil\frac{\alpha(\theta, \kappa_{leo}, \kappa)}{\Delta La}\right\rceil \times \left\lceil\frac{\alpha(\theta, \kappa_{leo}, \kappa)}{\Delta Lo}\right\rceil,$$

where, $\Delta La$ and $\Delta Lo$ are the average latitude difference and longitude difference between LEO satellites near the equatorial plane, respectively; the number of LEO satellites controllable within one hop of the local coordination layer controller is calculated, and a value thereof is 4 in FIG. 2.

(3) calculating the number N of LEO satellites controllable within H hops of single the local coordination layer controller as that:

$$N = 2 \cdot \left\{\frac{V(\theta, \kappa_{leo}, \kappa)}{2} + 2(H-1) + \sum_{j=1}^{H-1}\left(\frac{V(\theta, \kappa_{leo}, \kappa)}{2} + 2(H-1-j)\right)\right\};$$

where, is a counting factor, the number N of LEO satellites controllable within H hops of single local coordination layer controller is calculated, and a value thereof is 12 in FIG. 2.

(4) based on the number $M_{leo}$ of satellites in the LEO satellite constellation and the number N of LEO satellites controllable within H hops of single local coordination layer controller, calculating the number Q of required local coordination layer controllers on GSO or MEO satellites is $Q=M_{leo}/N$. Finally, based on the number of satellites in the LEO satellite constellation and the number of LEO satellites controllable within H hops of single local coordination layer controller, the number of required local coordination layer controllers on GSO or MEO satellites is calculated, and a value thereof is 4 in FIG. 2; a value of the $M_{leo}$ in FIG. 2 is 48.

Based on the above deployment process of local coordination layer controllers, the local coordination layer controller deployment architecture shown in FIG. 2 can be obtained. In which, each GSO satellite or MEO satellite carries load of the local coordination layer controller, and the LEO satellite network can be regarded as a torus lattice network, LEO satellites with a same color may be controlled by the same GSO or MEO local coordination layer controller, and the darker colored LEO satellites are the LEO satellites controllable within one hop of the local coordination layer controller.

The effect of the above embodiment can be further described by a simulation experiment below.

Figure 3A:
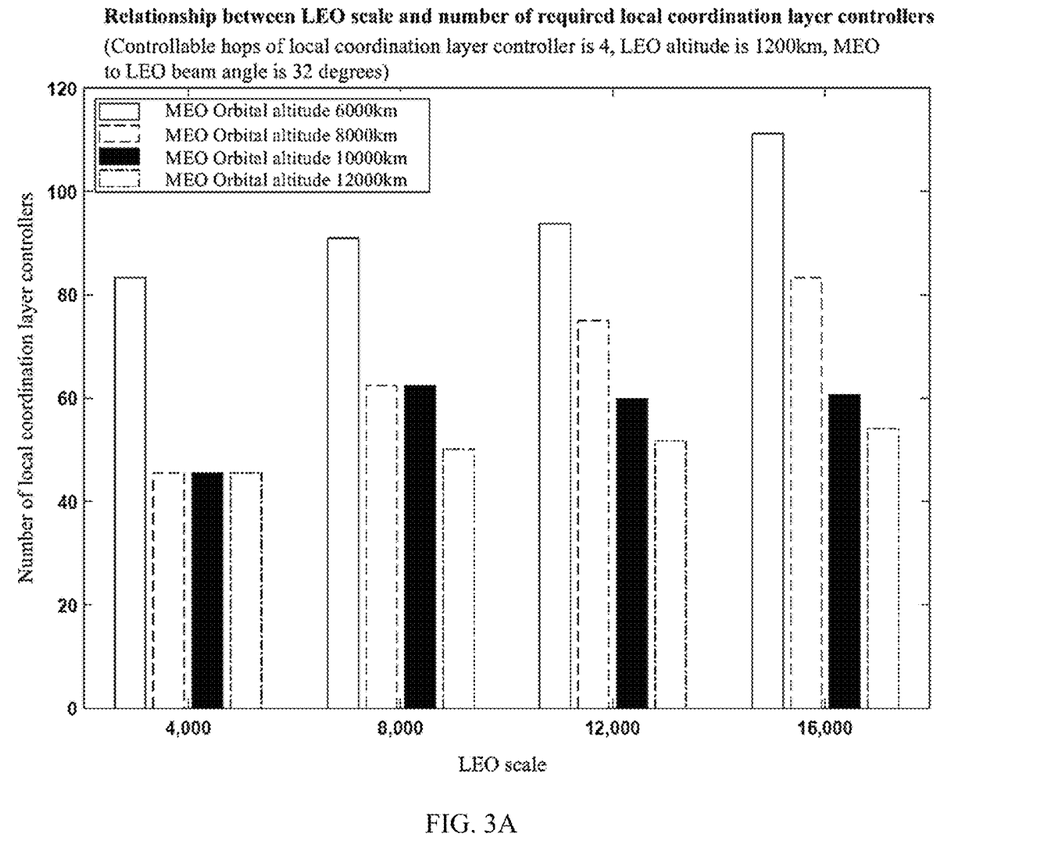
FIGS. 3A-3E illustrate experimental result diagrams of the local coordination layer controller deployment architecture for the large-scale satellite constellation according to an embodiment of the present disclosure.
Figure 3B:
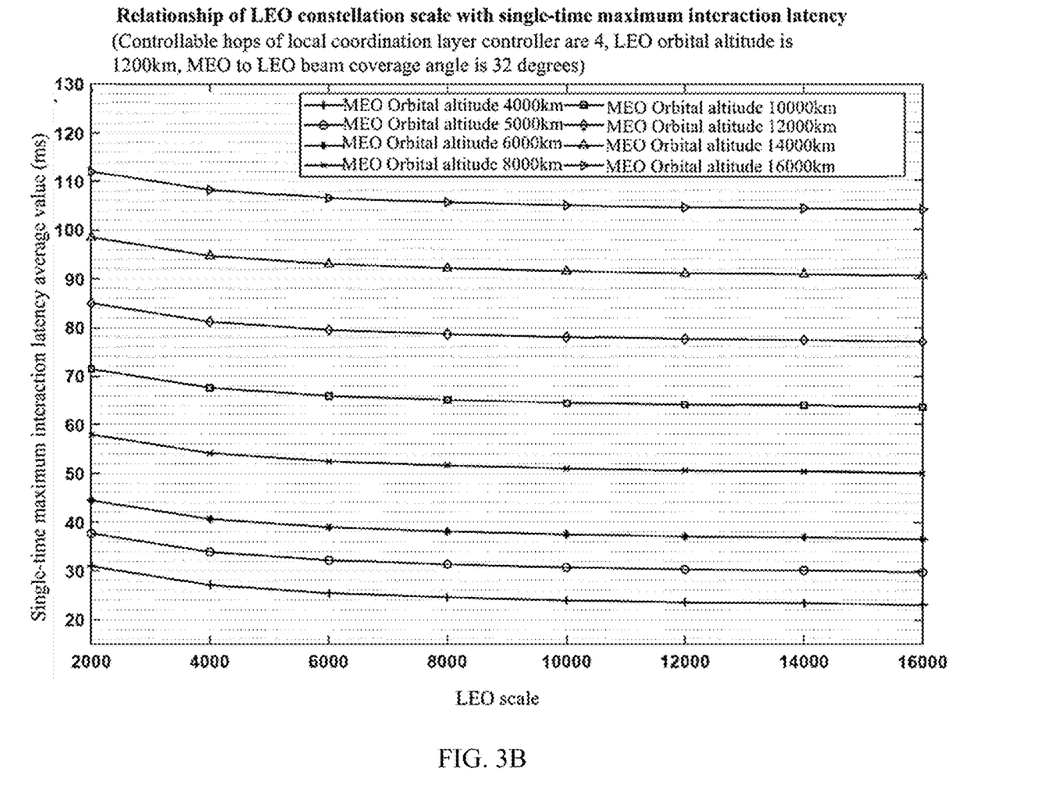

The simulation experiment is implemented on a MATLAB simulation software. First, the number of required local coordination layer controllers required and the latency performance of single-time interaction between the local coordination layer controller and the LEO satellite are simulated under different LEO satellite scales and different orbital altitudes of local coordination layer controller. At this time, the number of controllable hops of the local coordination layer controller is 4, the orbital altitude of LEO satellite is 1000 kilometers (km), the beam coverage angle of the local coordination layer controller is 32 degrees, and simulation results are shown in FIG. 3A and FIG. 3B. As seen from the two result diagrams, the number of required local coordination layer controllers increases with the increase of LEO satellite scale and decreases with the increase of orbital altitude of local coordination layer controller; and the latency of single-time interaction between the local coordination layer controller and the LEO satellite decreases with the increase of the LEO satellite scale and increases with the increase of orbital altitude of local coordination layer controller.

Figure 3C:
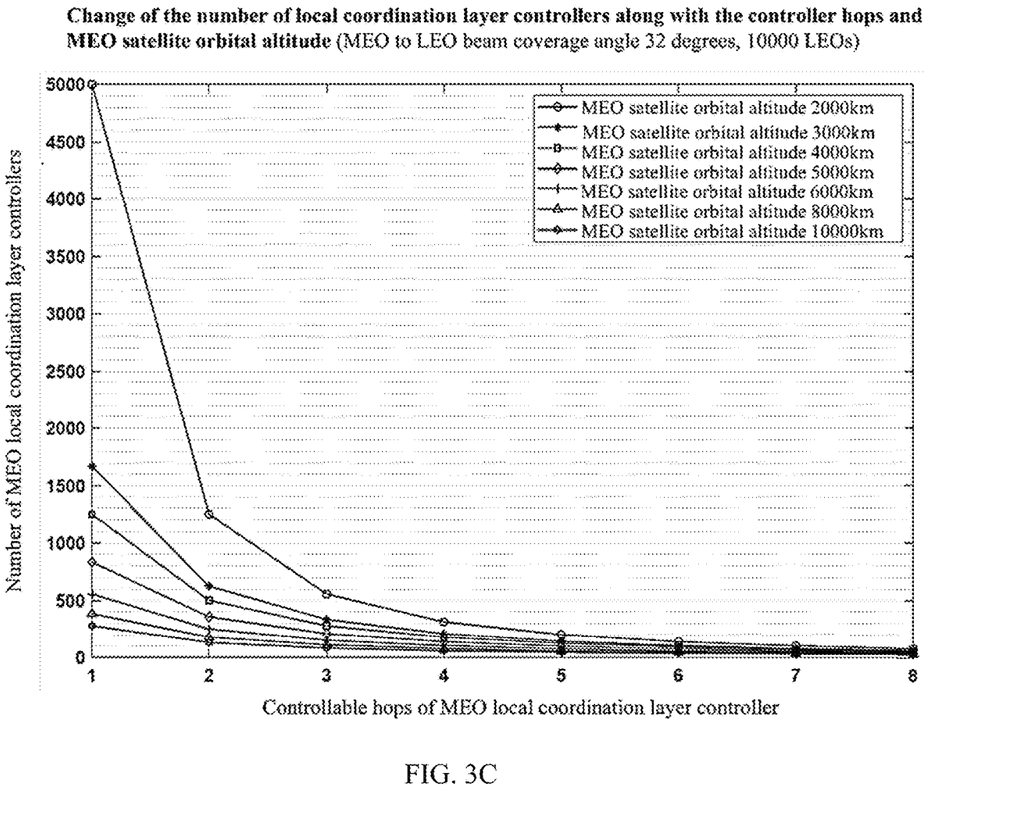
Figure 3D:
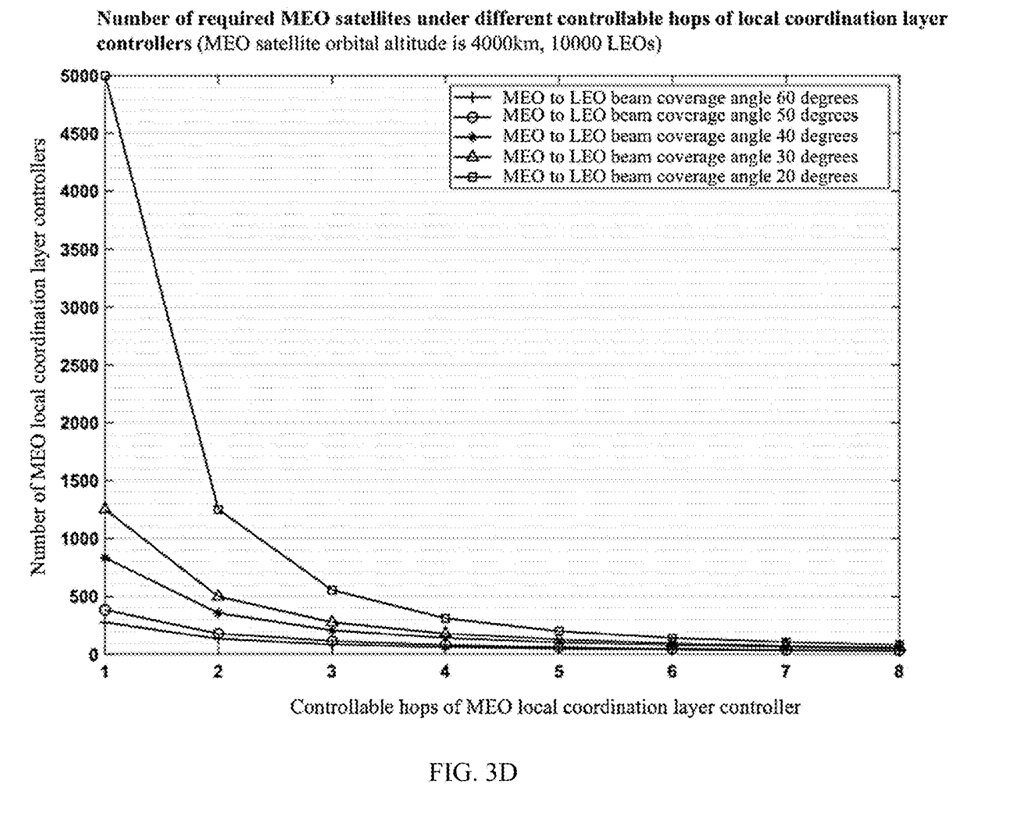
Figure 3E:
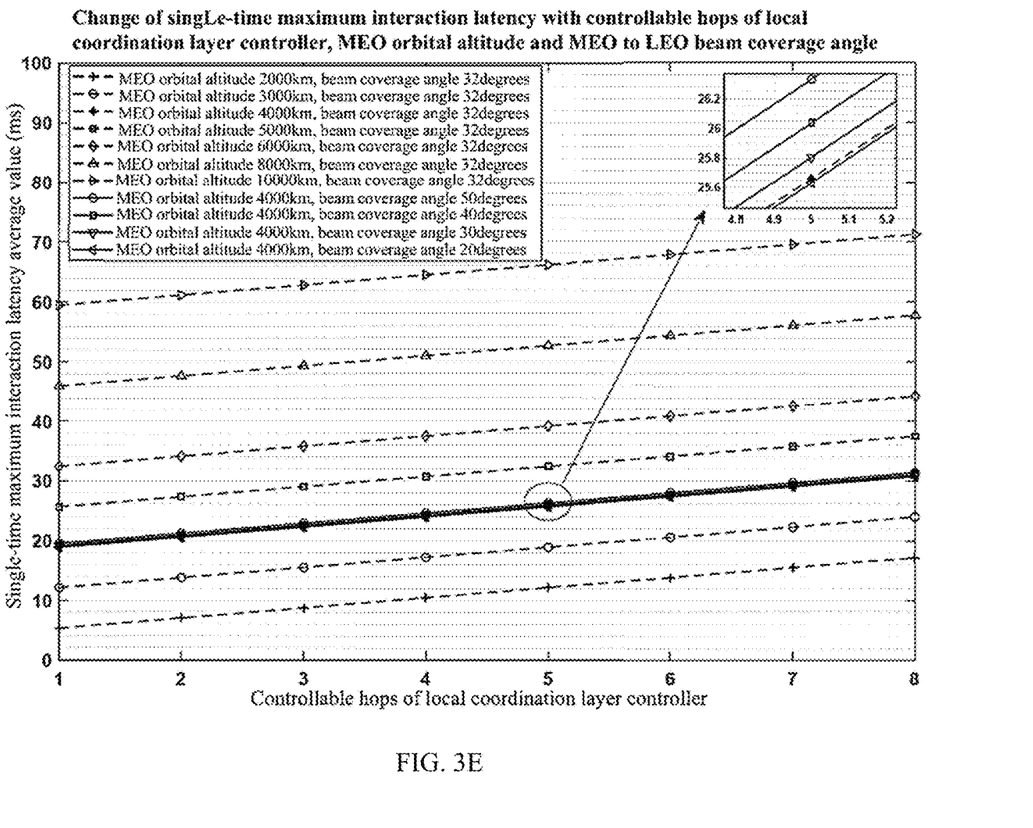

Moreover, influences of the orbital altitude of local coordination layer controller on the number of required local coordination layer controllers and the latency of single-time interaction between the local coordination layer controller and the LEO satellite are simulated under different controllable hops of local coordination layer controller, and at this time, the beam coverage angle of local coordination layer controller is 32 degrees, the number of LEO satellites is 10,000. In addition, influences of the beam coverage angle of local coordination layer controller on the number of required local coordination layer controllers and the latency of single-time interaction between the local coordination layer controller and the LEO satellite are simulated under different controllable hops of local coordination layer controller, and at this time, the orbital altitude of local coordination layer controller is 4,000 km, the number of LEO satellites is 10,000. Simulation results are shown in FIG. 3C, FIG. 3D and FIG. 3E. As seen from the three result diagrams, the number of local coordination layer controllers first decreases rapidly and then decreases gently with the increase of the controllable hops of local coordination layer controller; the higher the orbital altitude of local coordination layer controller and the larger the beam coverage angle, the less the number of required local coordination layer controllers required, and the greater an average latency of the single-time interaction between the local coordination layer controller and LEO satellite. Furthermore, it is also seen that, the influence of the orbital altitude of local coordination layer controller on the average latency of single-time interaction is much greater than the influence of the beam coverage angle of local coordination layer controller on the average latency of single-time interaction. A more important finding is that there is a trade-off between the number of deployed local coordination layer controllers and the average latency of single-time interaction, and blind increasing of the controllable hops of the local coordination layer controller cannot consistently bring about a larger benefit in the number of the local coordination layer controllers.

The above is hierarchical network operation and resource control architecture and method for a large-scale satellite constellation provided by the present disclosure, and the use of the architecture and the specific deployment scheme of the local coordination layer controllers in the architecture are given. It can be seen that the present disclosure realizes the network operation and resource control of the large-scale satellite constellation by deploying global organization layer controllers at ground gateway stations and the local coordination layer controllers at GSO satellites or MEO satellites, and the deployment of the local coordination layer controllers is not constrained by the problem of global deployment of stations. Moreover, the present disclosure further proposes a calculation formula for the number of local coordination layer controllers required under a certain scale of LEO satellite constellation, thereby supporting the system design of large-scale satellite constellation.

In the above embodiments, it can be realized in whole or in part by software, hardware, firmware or any combinations thereof. When implemented in whole or in part in the form of computer program product, the computer program product includes one or more computer instructions. When the computer program instructions are loaded or executed on a computer, the process or functions according to the embodiments of the present disclosure can be generated in whole or in part. The computer may be a general-purpose computer, a special-purpose computer, a computer network, or other programmable device. The computer instructions may be stored in a computer-readable storage medium or transmitted from one computer-readable storage medium to another computer-readable storage medium. For example, the computer instructions may be transmitted from a website node, computer, server or data center to another website node, computer, server or data center through a wired manner (e.g., coaxial cable, optical fiber, digital subscriber line (DSL) or a wireless manner (e.g., infrared, wireless, microwave, etc.). The computer-readable storage medium can be any available medium that can be accessed by a computer, or a data storage device such as one or more available media integrated server or data center. The available medium may be a magnetic medium (e.g., floppy disk, hard disk, magnetic tape), an optical medium (e.g., DVD), or a semiconductor medium (e.g., solid state disk (SSD)), etc.

The above description is only specific embodiment of the present disclosure, but the protection scope of the present disclosure is not limited to this. Within the technical scope disclosed by the present disclosure, any modification, equivalent substitution and improvement made by any person familiar with the technical field within the spirit and principle of the present disclosure shall be included in the protection scope of the present disclosure.

What is claimed is:

1. A hierarchical network operation and resource control method for a giant satellite constellation, comprising:
    step 1, constantly acquiring attributes of resource of whole network and reshaping the resource, performing service element extraction and service reshaping on a service that requires wireless resource allocation, and sending the service and the attributes of resource after reshaping to an intelligent resource management module as management decision indicators, by a ground global organization layer controller;
    step 2, performing real-time monitoring and management on services, faults and satellites, and reshaping operation and measurement data into service states, satellite states and resource states required by wireless resource management decision, by an operation and measurement control module;
    step 3, making, by a wireless resource management sub-module of the intelligent resource management module, global wireless resource management decision based on decision indicators provided by a service reshaping module, a resource reshaping module and a state reshaping module and the service and the attributes of resource after reshaping, wherein the global wireless resource management decision comprise types of allocated resource and required resource quantities of the allocated resource;
    step 4, mapping, by a decision matching module, the global wireless resource management decision made by the wireless resource management sub-module of the intelligent resource management module to a corresponding one of local coordination layer controllers;
    step 5, caching and sorting as per priority, by a match mapping module of the corresponding one of the local coordination layer controllers, a plurality of global resource management decision; and processing, by a resource slice operation module, the plurality of global resource management decision in order of the priority; wherein for the global wireless resource management decision, the resource slice operation module obtains wireless resource requirement for completing current the service according to information of the global wireless resource management decision, and allocates and generates specific service resource slices for the service; and
    step 6, mapping the service resource slices to specific physical devices and physical resource to support an entire process of service, wherein the resource slices are hierarchical characterization of virtual resource;
    wherein in step 5, a deployment method of the local coordination layer controllers comprises:
    (1) based on an orbital altitude difference $\kappa$ between a geosynchronous orbit (GSO) or medium earth-orbit (MEO) satellite and a low earth-orbit (LEO) satellite, an orbital altitude $\kappa_{leo}$ of the LEO satellite, a beam coverage angle $\theta$ of the GSO or MEO satellite, and average latitude difference $\Delta La$ and longitude difference $\Delta Lo$ between LEO satellites, solving an equation as follows:

$$\tan\frac{\theta}{2} = \frac{(R+\kappa_{leo})\sin(\alpha(\theta, \kappa_{leo}, \kappa))}{(R+\kappa_{leo}+\kappa) - (R+\kappa_{leo})\cos(\alpha(\theta, \kappa_{leo}, \kappa))};$$

where, a sphere O is a sphere with the center of the Earth as its center and a distance R from any point in an orbital plane of the LEO satellite to the center of the Earth as its radius, $\alpha(\theta, \kappa_{leo}, \kappa)$ is a sphere center angle of the sphere O corresponding to a beam angle of the local coordination layer controller, and a value of $\alpha(\theta, \kappa_{leo}, \kappa)$ is obtained by solving the following equations:

$$\begin{cases} \alpha(\theta, \kappa_{leo}, \kappa) = \arccos\left[\frac{(R+\kappa+\kappa_{leo})^2 + (R+\kappa_{leo})^2 - x^2}{2(R+\kappa_{leo})(R+\kappa+\kappa_{leo})}\right] \\ \cos\frac{\theta}{2} = \frac{(R+\kappa+\kappa_{leo})^2 + x^2 - (R+\kappa_{leo})^2}{2x(R+\kappa+\kappa_{leo})} \end{cases};$$

where, x is a maximum linear distance between any one of the local coordination layer controllers and any one LEO satellite in a control domain of the local coordination layer controller;
    (2) calculating a number $V(\theta, \kappa_{leo}, \kappa)$ of LEO satellites covered by a rectangular or circular antenna beam of the local coordination layer controller as follows:

$$V(\theta, \kappa_{leo}, \kappa) \approx \left\lceil \frac{\alpha(\theta, \kappa_{leo}, \kappa)}{\Delta La} \right\rceil \times \left\lceil \frac{\alpha(\theta, \kappa_{leo}, \kappa)}{\Delta Lo} \right\rceil,$$

where, $\Delta La$ and $\Delta Lo$ are the average latitude difference and longitude difference between LEO satellites near the equatorial plane, respectively;
    (3) calculating a number N of LEO satellites controllable within H hops of single the local coordination layer controller:

$$N = 2 \cdot \left\{ \frac{V(\theta, \kappa_{leo}, \kappa)}{2} + 2(H-1) + \sum_{j=1}^{H-1}\left(\frac{V(\theta, \kappa_{leo}, \kappa)}{2} + 2(H-1-j)\right) \right\};$$

where, j is a counting factor, and H is a positive integer; and
    (4) based on a number $M_{leo}$ of satellites in a LEO satellite constellation and the number N of LEO satellites controllable within H hops of single the local coordination layer controller, calculating a number Q of the local coordination layer controllers deployed on GSO or MEO satellites is $Q=M_{leo}/N$;
    wherein the intelligent resource management module including the wireless resource management sub-module, the operation and measurement control module, the service reshaping module, the resource reshaping module, the state reshaping module, and the decision matching module are integrated into the global organization layer controller; and the match mapping module and the resource slice operation module are integrated into the corresponding local coordination layer controller.

2. A hierarchical network operation and resource control system, implementing the hierarchical network operation and resource control method as claimed in claim 1, wherein the hierarchical network operation and resource control system comprises:
    a service layer, comprising K services to be controlled, wherein the K services to be controlled are used as inputs of the hierarchical network operation and resource control system to drive operation of whole system, K is a positive integer;

a global organization layer, comprising one global organization layer controller, wherein the global organization layer is deployed at a ground gateway station and configured to realize "operation, measurement and control" integrated control of whole network and global resource management decision;

a local coordination layer, comprising Q local coordination layer controllers, wherein the Q local coordination layer controllers all are deployed at GSO or MEO satellites and configured to realize local resource management decision and management slice generation, Q is a positive integer; and a resource layer, comprising a physical resource domain and a virtual resource domain, wherein the physical resource domain contains satellites on different orbits and ground gateway stations and is configured to supply physical resource entities, wireless resource and transmission channels; and the virtual resource domain is configured to realize virtualization of physical resource, build a virtual resource pool and a virtual resource space, and perform hierarchical characterization of virtual resource.

3. The hierarchical network operation and resource control system as claimed in claim 2, wherein the global organization layer controller comprises:

a service reshaping module with an element extraction function and a service reshaping function, wherein the element extraction function is configured to analyze service attributes and features and realize extraction of service key elements, the service reshaping function is configured to perform unified characterization on the services to be controlled according to extracted service element information, and the service attributes and features comprise service types, service statistical features, and service quality requirement;

a resource reshaping module with an attribute extraction function and a resource reshaping function, wherein the attribute extraction function is configured to acquire and analyze resource attributes of whole network, the resource reshaping function is configured to realize unified characterization on the resource attributes of whole network, and the resource attributes of whole network comprise resource types and resource distribution;

an operation and measurement control module, configured to measurement and operation control of whole network to ensure effectiveness and reliability of satellite network;

a state reshaping module, configured to realize unified characterization on network states of whole network to provide diversified decision dimensions for resource management decision;

an intelligent resource management module, configured to realize global resource management decision of network including wireless resource management decision and mobility management decision; and a decision matching module, configured as an interface between the global organization layer controller and the local coordination layer controllers, and configured to realize matching of the global resource management decision with the local coordination layer controllers and map the global resource management decision to matched local coordination layer controllers;

wherein the service reshaping module, the resource reshaping module, the operation and measurement control module, the state reshaping module, the intelligent resource management module, and the decision matching module are software modules stored in one or more memories in the global organization layer controller and executable by one or more processors in the global organization layer controller coupled to the one or more memories.

4. The hierarchical network operation and resource control system as claimed in claim 2, wherein each of the local coordination layer controllers comprises:

a match mapping module, configured to store the global resource management decision mapped from the global organization layer controller to current the local coordination layer controller, realize classification and queueing as per decision priority on the stored global resource management decision, and send the global resource management decision sequentially to a resource slice operation module according to the decision priority;

a parameter migration module, configured to perform partial migration of decision knowledge and experience parameters of the global organization layer and thereby realize local decision of wireless resource management and mobility management; and the resource slice operation module, configured to realize resource slice computation and generation according to the local resource management decision;

wherein the match mapping module, the parameter migration module, and the resource slice operation module are software modules stored in one or more memories in the local coordination layer controller and executable by one or more processors in the local coordination layer controller coupled to the one or more memories.

5. The hierarchical network operation and resource control system as claimed in claim 3, wherein the operation and measurement control module comprises:

a service management sub-module, configured to centralized management of services of whole network, wherein the centralized management comprises service analysis, service statistics and service forecast;

a fault management sub-module, configured to realize real-time sensing, diagnosis, recovery, statistics and post-maintenance of faults of satellite, wherein types of the faults comprise satellite network faults, satellite device faults and satellite operation faults; and a satellite management sub-module, configured to realize analysis and statistics of quantity and quality of resource of whole network, wherein types of the resource comprise satellite computation resource, satellite storage resource, inter-satellite link resource, satellite-ground feed and service link resource, spectrum resource, and antenna resource.

6. The hierarchical network operation and resource control system as claimed in claim 3, wherein the state reshaping module comprises: a service state sub-module, a satellite state sub-module and a resource state sub-module; the service state sub-module, the satellite state sub-module and the resource state sub-module are configured to extract service state data, satellite state data and resource state data respectively from the operation and measurement control module, and reshape the service state data, the satellite state data and the resource state data respectively to obtain reshaped data; and the reshaped data are used as decision indicators of the intelligent resource management module.

7. The hierarchical network operation and resource control system as claimed in claim 6, wherein the intelligent resource management module comprises:

a wireless resource management sub-module, configured to realize global wireless resource management decision of services, wherein the global wireless resource management decision comprises resource types required by services; and the resource types comprise spectrum, timeslot, power and antenna, and required resource quantities; and a mobility management sub-module, configured to perform location management of user nodes and handover management of services, wherein the location management comprises location update of user nodes and location attachment point selection of user nodes, and the handover management comprises handover trigger decision of services and handover target selection of services.

8. The hierarchical network operation and resource control system as claimed in claim 4, wherein the resource slice operation module is configured to compute and generate service resource slices and switching management slices;

wherein the service resource slices contain spectrum resource, power resource, timeslot resource and antenna resource required by services; and the spectrum resource, the power resource, the timeslot resource and the antenna resource are capable of being mapped to specific physical devices and physical resource on the resource layer, to achieve allocation and scheduling of wireless resource of services;

wherein the switching management slices contain signaling carrying resource required for service handover, beam resource and channel resource; the signaling carrying resource, the beam resource and the channel resource are capable of being mapped to specific physical devices and physical resource, to achieve allocation and scheduling of wireless resource required for signaling interaction during a service handover process and thereby ensure reliability of the service handover process.

* * * * *